April 24, 1934.   W. W. CARTER, JR   1,956,314
DECORATED LAMINATED MATERIAL AND METHOD OF PRODUCING SAME
Filed May 18, 1932
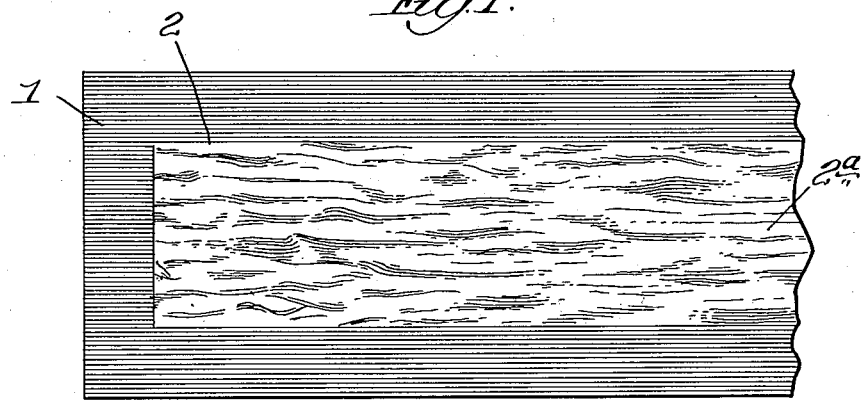
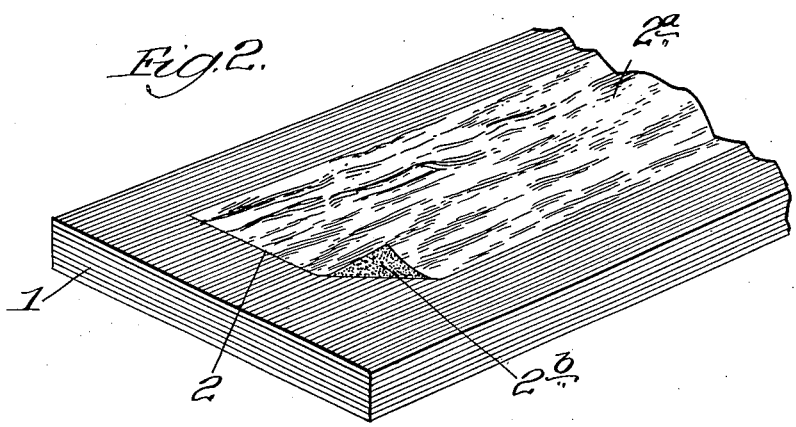
Inventor:
William W. Carter, Jr.

Patented Apr. 24, 1934

1,956,314

UNITED STATES PATENT OFFICE 1,956,314

DECORATED LAMINATED MATERIAL AND METHOD OF PRODUCING SAME

William W. Carter, Jr., Cincinnati, Ohio, assignor to The Formica Insulation Company, Cincinnati, Ohio, a corporation of Ohio Application May 18, 1932, Serial No. 612,092

7 Claims. (Cl. 41—22)

This invention relates particularly to a laminated product having a decorated, or ornate, surface and to a process of producing said product.

The principal object of the invention is to provide a decorated laminated product whose surface has an inlay-effect appearance.

A further object is to provide a simple and effective method enabling any desired inlay appearance to be cheaply produced on a surface, or surfaces, of a laminated product. The purpose of the invention is accomplished by a very simple method which possesses great flexibility and enables a great variety of inlay-designs to be produced in such manner as to render unnecessary the carrying of excessive stocks of materials in process and/or finished products.

The invention finds its greatest usefulness in the manufacture of imitation woods, especially in the field of laminated products consisting of sheets of paper or other fabric, and a heat-hardened binder. By means of the improved process laminated products having surfaces rivaling the most beautiful and expensively made inlaid woods may be produced at relatively small cost.

More specifically stated, the invention makes use of the principle of employing, in a laminated product, a surface sheet of transparent character having its inner surface coated with an opaque pigment of desired color and having on its outer surface a print of any desired design, preferably in contrasting color. Such surface sheet may be impregnated with a clear solution of a suitable binder, such as a solution of bakelite, and may be consolidated with a background body of impregnated sheets of contrasting color, the whole being compacted and hardened under heat and pressure.

The surface-sheet may be of smaller dimensions than the body-sheets, or background-sheet, and may be of any desired design in contour, or may be cut-away; or skeletonized, in any desired manner; and such surface-sheet, bearing on its back surface an opaque coating of such color that the ultimate color of the surface-sheet will contrast with the color of the body of the laminated product, the desired inlay-effect is secured by the consolidating operation.

For example, the background sheets may be of black color, the pigment applied to the back surface of the surface-sheet may be of ivory or purplish ivory color, and the printing on the outer surface of the surface-sheet may be in imitation of a mahogany grain; and when such a composite stack of sheets (the surface sheet being of relatively small area) is consolidated under heat and pressure, the effect is to produce a laminated product having an ebony-like body and a mahogany inlay.

Moreover, by employing a surface-sheet which is transparent, or semi-transparent (translucent), after the consolidating operation, an effect of depth, or perspective, is obtained, due to the fact that the printed or grained surface is at a higher level than the opaque pigmented back surface of the surface-sheet. The surface-sheet, however, does not appear as an overlay (raised), but resembles a true inlay, the entire surface of the laminated product lying, due to the pressing operation, in the same plane.

The effect is that of a beautiful inlaid wood rivaling in appearance the most beautiful handiwork producible in natural woods by the laborious methods employed in producing such inlays.

The finest gradations in tones can be produced by varying the colors and grains employed, it being noted that the ultimate color of the grained surface-sheet is a composite of the color of the pigmented back surface, the printed front surface, and the binder in the surface-sheet. The coating of pigment at the inner face of the surface-sheet, it should be understood, substantially cuts off or hides the background or body beneath; and it is evident that the coating of the rear surface of the surface-sheet is a feature which lends great flexibility to the process, enabling, as it does, the simple application of a suitably treated surface-sheet of any desired design to be applied to impregnated stock sheets of any desired contrasting color.

In its broadest aspect, the present invention constitutes a modification of the process described in Cochrane Patent 1,863,239, granted June 14, 1932, assigned to The Formica Insulation Company, assignee of the present application.

The invention will be better understood by reference to the accompanying drawing, in which:

Figure 1 is a broken plan view of an improved laminated product made in accordance with the invention; Fig. 2, a perspective view of a stack of impregnated body-sheets and a surface-sheet of decorative material having a pigmented lower surface; and Fig. 3, an edge view of the improved decorated, consolidated product.

As illustrated in the drawing the numeral 1 designates a body formed of one or more sheets of fibrous material which have been impregnated with a binder capable of being hardened under heat and pressure, such as a phenolic condensation product, or other synthetic resin capable of hardening under heat; and 2 designates a transparent, or semi-transparent surface-sheet of material, such as white or tinted paper or thin cloth printed with a suitable design or pattern 2a, by any desired method. The sheet 2 is then impregnated with a clear (or tinted) varnish or binding agent, such as those indicated above. An opaque light-colored pigment 2b, such as titanium oxide or zinc sulfide, is applied to the lower surface of the surface-sheet of decorative material by any suitable method, such as by passing the sheet over a roller dipped in a bakelite solution carrying a suspension of the pigment. The opaque coating preferably is applied before dipping the surface-sheet in clear bakelite solution, but the order of the steps may be varied.

The pigment may be suspended in a solution of bakelite. For example, one may mix with a solution of bakelite, a suitable percentage of white titanium oxide. Such oxide preferably comprises 15% to 20% of the mixture, but it may be as low as 10%. If desired, the pigmented solution may be tinted as by adding small percentages of suitable dyes. Colored pigments may be used in very small percentages to vary the effect.

The sheet of decorative material, prepared in the above described manner, may be cut into pieces, if desired, and the pieces may be of such shape and arranged in such manner that any desired pattern or motif may be produced. The sheets 2 are then assembled upon one or both surfaces of a plurality of sheets of fibrous material impregnated with the same or a darker binding agent, in such a manner that the lower pigmented surface of the decorative sheet is in contact with the outer surface of the body sheet while the upper decorated surface of the sheet 2 forms the outer surface-sheet of the assembled sheets.

If desired, the surface-sheet, coating of pigment, may be of the same dimensions as the body-sheets, in which case an inlay-effect will not be secured, but, nevertheless, a beautiful decorated laminated product can be produced.

A surface layer is thus formed as shown in Fig. 1 of the drawing, with a border of dark or plain contrasting color, and a decorative center resembling wood, which appears as if it were formed interiorly of the border by an inlay process.

The assembly of decorative and body sheets may be pressed or molded in the usual manner to form a consolidated laminated article or body having decorative surface-sheets, by placing the assembly in the matrix of a molding press and subjecting the sheets to pressure and heat, say approximately 2000 lbs. per square inch while maintaining the temperature at about 160° to 190° C., for a sufficient length of time to unite the decorative surface material and the body material and to form a consolidated article.

Any light-colored transparent or translucent decorative paper or cloth may be utilized, as a surface-sheet but, in order to produce a uniform article, all pieces of the decorative material employed in the same plane should be of approximately the same thickness.

By employing my improved method which I have described, laminated material having beautiful inlay appearing effects may be obtained which is characterized by having a seamless and uniform appearance. The finish produced closely resembles that of wood but it is more economical to fabricate since no additional finishing treatment is required.

The possible number of patterns or designs which may be produced by my method is practically unlimited. Any combination of transparent fibrous material, such as colored or decorated cloth or paper may be employed in producing panels which are suitable for furniture fabrication or for interior decorating purposes. Inlaid effects in trays for dining service may be produced.

Any suitable binding agent adapted to harden under heat may be employed. Artificial resins adaptable to the purpose are known. They include phenolic condensation products, such as bakelite; condensation products of the urea-formaldehyde type; and furfural resins of various kinds. Darkly colored solutions of resins may, for example, be used in the body-sheets, but, nevertheless, light wood effects may be secured by using light colored opaque pigment on the back face of the surface-sheet.

The order of steps may be varied without departure from the invention.

The foregoing detailed description has been given for clearness of understanding only and no unnecessary limitations should be understood therefrom, but the appended claims should be construed as broadly as permissible, in view of the prior art.

What I regard as new, and desire to secure by Letters Patent, is:

1. In a process of manufacturing a laminated product, the steps which comprise: consolidating under heat and pressure a main body of sheets of fabric impregnated with a binder and a surface sheet impregnated with a clear binder and having an outer printed surface and an inner surface bearing an opaque coating, said surface sheet being effectively transparent after the consolidating operation.

2. A process as set forth in claim 1 in which the surface sheet covers less than the complete area of the body of the product and produces an inlay effect.

3. A process as set forth in claim 1, in which the surface sheet is of less area than the body and possesses a color which contrasts with the color of the body, thus giving an inlay effect.

4. In a process of manufacturing a laminated inlay product, the steps which comprise: consolidating under heat and pressure a body comprising a sheet or sheets of fabric impregnated with a synthetic resin adapted to harden under heat, and a surface sheet of fabric of transparent character which is impregnated with a clear binder adapted to harden under heat and which bears on its outer surface printed graining and on its inner surface an opaque coating, the outer sheet covering less than the entire area of the body and contrasting in color with the color of the body.

5. In a process of manufacturing a laminated inlay product, the steps which comprise; consolidating under heat and pressure a main body of sheets of fabric impregnated with a heat-hardenable phenolic condensation product and having a dark color, and a surface sheet of fabric impregnated with a heat-hardenable clear phenolic condensation product and having a printed outer surface and an inner surface coated with opaque pigment, the surface sheet being of lesser area than the body and effectively transparent after the consolidating operation and the surface sheet having a color contrasting with the color of the body.

6. A decorated composite laminated product, comprising: body sheets of fabric impregnated with a heat-hardenable condensation product; and a surface sheet of fabric of transparent character having a printed outer surface and having an opaque coating on its inner surface, said surface sheet impregnated with a clear heat-hardenable condensation product and covering less than the complete area of one side of said body—all of said sheets being consolidated together under heat and pressure and the condensation product being in the final infusible and substantially insoluble condition.

7. A product as specified in claim 6, in which the body and the surface sheet possess contrasting colors.

WILLIAM W. CARTER, Jr.